(12) United States Patent
Wang

(10) Patent No.: US 8,891,974 B2
(45) Date of Patent: Nov. 18, 2014

(54) DISTORTION COMPENSATION CIRCUIT INCLUDING TUNABLE PHASE PATH

(75) Inventor: Yi Wang, Katy, TX (US)

(73) Assignee: Applied Optoelectronics, Inc., Sugar Land, TX (US)

(*) Notice: Subject to any disclaimer, the term of this patent is extended or adjusted under 35 U.S.C. 154(b) by 301 days.

(21) Appl. No.: 13/435,595

(22) Filed: Mar. 30, 2012

(65) Prior Publication Data
US 2013/0259485 A1 Oct. 3, 2013

(51) Int. Cl.
*H04B 10/04* (2006.01)
*H04B 10/00* (2013.01)

(52) U.S. Cl.
USPC ............ 398/193; 398/115; 398/194; 398/195

(58) Field of Classification Search
CPC .................. H04B 10/25137; H04B 10/15759; H04B 10/58
USPC .................................. 398/115–117, 192–195
See application file for complete search history.

(56) References Cited

U.S. PATENT DOCUMENTS

| | | | |
|---|---|---|---|
| 4,068,186 A | 1/1978 | Sato et al. | |
| 4,242,636 A | 12/1980 | Gilmer et al. | |
| 4,710,723 A | 12/1987 | Pelchat et al. | |
| 4,992,754 A | 2/1991 | Blauvelt et al. | |
| 5,027,402 A | 6/1991 | Richards et al. | |
| 5,132,639 A | 7/1992 | Blauvelt et al. | |
| 5,187,713 A | 2/1993 | Kwa | |
| 5,252,930 A * | 10/1993 | Blauvelt ........................ 330/149 |
| 5,321,710 A | 6/1994 | Cornish et al. | |
| 5,343,843 A | 9/1994 | Hamren | |
| 5,361,156 A | 11/1994 | Pidgeon | |
| 5,418,637 A | 5/1995 | Kuo | |
| 5,424,680 A | 6/1995 | Nazarathy et al. | |
| 5,436,749 A | 7/1995 | Pidgeon, Jr. et al. | |
| 5,481,389 A | 1/1996 | Pidgeon et al. | |
| 5,548,109 A | 8/1996 | Butturini et al. | |
| 5,600,472 A | 2/1997 | Uesaka | |
| 5,614,851 A | 3/1997 | Holzer et al. | |
| 5,680,238 A | 10/1997 | Masuda | |
| 5,689,356 A | 11/1997 | Rainal | |

(Continued)

OTHER PUBLICATIONS

Office action dated Mar. 3, 2011 received in U.S. Appl. No. 12/025,883.

(Continued)

*Primary Examiner* — Daniel Dobson
(74) *Attorney, Agent, or Firm* — Grossman Tucker Perreault & Pfleger, PLLC; Norman S. Kinsella

(57) ABSTRACT

A distortion compensation circuit compensates for distortion generated by one or more non-linear elements such as a laser device and/or an optical fiber and may include a primary signal path for carrying an input signal and a secondary signal paths for generating distortion. The distortion compensation circuit may also include a controllable phase inverters and a tunable filter. For example, the secondary signal path may include a distortion generator to produce distortion products from the input signal and a signal controlled phase inverter that inverts the phase of the distortion products and a tunable filter that adjusts the phase of the frequency dependent distortion. The phase inversion and tunable filter may be controlled in response to control signals generated based on one or more parameters such as, for example, laser power, input RF channel loading, temperature, and fiber length.

20 Claims, 5 Drawing Sheets

(56) References Cited

U.S. PATENT DOCUMENTS

| | | | |
|---|---|---|---|
| 5,694,386 | A | 12/1997 | Hirajima et al. |
| 5,703,530 | A | 12/1997 | Sato et al. |
| 5,751,531 | A | 5/1998 | Rault |
| 6,055,278 | A | 4/2000 | Ho et al. |
| 6,061,161 | A | 5/2000 | Yang et al. |
| 6,118,479 | A | 9/2000 | Maeda et al. |
| 6,122,085 | A | 9/2000 | Bitler |
| 6,133,790 | A | 10/2000 | Zhou |
| 6,181,453 | B1 | 1/2001 | Darcie et al. |
| 6,377,552 | B1 | 4/2002 | Moran et al. |
| 6,388,518 | B1 | 5/2002 | Miyatani |
| 6,404,241 | B1 | 6/2002 | Ackerman |
| 6,559,994 | B1 | 5/2003 | Chen et al. |
| 6,727,761 | B1 | 4/2004 | Apel |
| 6,741,128 | B2 | 5/2004 | Okubo et al. |
| 6,757,525 | B1 | 6/2004 | Ishikawa et al. |
| 6,759,897 | B2 | 7/2004 | Ciemniak |
| 6,917,764 | B1 | 7/2005 | Wilson |
| 6,919,765 | B2 | 7/2005 | Zappala |
| 6,943,628 | B2 | 9/2005 | Weldon |
| 7,466,925 | B2 | 12/2008 | Iannelli |
| 7,573,923 | B2 | 8/2009 | Zheng |
| 7,925,170 | B2 | 4/2011 | Ishaug |
| 2001/0054927 | A1 | 12/2001 | Zhou et al. |
| 2002/0063930 | A1 | 5/2002 | Blauvelt |
| 2003/0081667 | A1 | 5/2003 | Camnitz |
| 2004/0056720 | A1 | 3/2004 | Jansen et al. |
| 2004/0239428 | A1 | 12/2004 | Apel |
| 2006/0056327 | A1 | 3/2006 | Coersmeier |
| 2006/0078339 | A1 | 4/2006 | Ng |
| 2009/0196630 | A1* | 8/2009 | Ishaug et al. ................ 398/193 |
| 2009/0237171 | A1 | 9/2009 | Zheng et al. |

OTHER PUBLICATIONS

Applied Optoelectronics, Inc., "DFB-1310-P3-xx-A3-xx Laser Module", Applied Optoelectronics, Inc. 2006, pp. 1-6.

Applied Optoelectronics, Inc., "DFB-1310-P2-xx-A3-xx Predistorted Laser Transmitter", Applied Optoelectronics, Inc. 2005, pp. 1-5.

Applied Optoelectronics, Inc., "DFB-1xxx-P3-xx-A3-xx Laser Module", Applied Optoelectronics, Inc. 2006, pp. 1-8.

Linear Technology, "LT5534-50 MHz to 3GHz RF Power Detector with 60dB Dynamic Range," available at http://cds.linear.com/docs/Datasheet/5534fc.pdf, retrieved on Jul. 27, 2011.

Cisco, "Prisma II 1 GHz SuperQAM Transmitter," available at www.cisco.com/en/US/prod/collateral/video/ps8806/. . ./7019211b.pdf, retrieved on Jul. 27, 2011.

Scientific Atlanta, "Optoelectronics Prisma ll 1 GHz 1550 nm Transmiters," available at http://tulsat.com/productImages/DownloadFiles/1GHz_1550.pdf; retrieved on Jul. 27, 2011.

Office Action dated Mar. 8, 2010 received in U.S. Appl. No. 11/834,873.

Notice of Allowance dated Dec. 8, 2010 received in U.S. Appl. No. 11/834,873.

International Search Report and Written Opinion dated Mar. 30, 2009 issued in related International Patent Application No. PCT/US2009/033175.

Office Action dated Mar. 1, 2011 received in U.S. Appl. No. 12/026,182.

PCT Search Report and Written Opinion received in related Application No. PCT/US08/64682 dated Jul. 22, 2008, pp. 8.

PCT Search Report and Written Opinion received in related Application No. PCT/US08/64684 dated Jul. 23, 2008, pp. 9.

Office Action dated Feb. 18, 2011 received in U.S. Appl. No. 12/053,104, 19 pgs.

U.S. Office Action dated Oct. 30, 2009 issued in related U.S. Appl. No. 11/753,162.

Office Action dated Jul. 20, 2010 received in U.S. Appl. No. 11/753,162, 18 pgs.

* cited by examiner

DISTORTION COMPENSATION CIRCUIT INCLUDING TUNABLE PHASE PATH

TECHNICAL FIELD

The present invention relates to distortion compensation circuits and more particularly, to distortion compensation circuits including a tunable phase path.

BACKGROUND INFORMATION

A directly modulated laser may be used as an optical transmitter that transmits light at a given wavelength. The power (i.e., amplitude) of the laser light is modulated by corresponding modulation of the current used to drive the laser. For example, the optical transmitter may be modulated to carry a wide-band RF signal. In this case, the electrical current that drives or pumps the laser is modulated with the wide-band RF signal.

The use of a directly-modulated laser to carry a wide-band RF signal may result in distortion due to the multiple carrier frequencies of the multichannel RF signal modulating the laser and/or the harmonics produced by the non-linear nature of the laser device. Intermodulation distortion may be produced when two or more signals (e.g., 2 or more carriers) mix together to form distortion products. Discrete distortion may be produced from only one carrier. Distortion may include even-order distortion and odd-order distortion. In a CATV system, the most significant types of even-order and odd-order distortion products are second-order distortion products and third-order distortion products, respectively. Second-order intermodulation ($IM_2$) distortion products may include, for example, intermodulation products formed by combining signals at frequencies A and B to produce new signals at the combined frequencies, such as A±B. Third-order intermodulation ($IM_3$) distortion products may include, for example, intermodulation products formed by combining signals at frequencies A, B, and C to produce new signals at frequencies A±B±C and 2A±B.

In a CATV system, there are a multitude of carriers spaced equally in frequency, which may produce numerous intermodulation distortion products that lie at the same frequency. The sum of second-order intermodulation products that are present at a particular frequency is commonly referred to as composite second order (CSO) distortion. In a CATV system, the equal spacing of the carriers may also cause multiple third-order intermodulation products to line up at the same frequency and directly on top of the carrier frequency. The sum of these third-order intermodulation products that are present in a particular channel is commonly referred to as composite triple beat (CTB) distortion.

The non-linearities of a time-independent non-linear element, such as an amplifier, may be modeled as Taylor series expansions or power series expansions of an input signal. For example, the output y of a non-linear amplifier may be described as a Taylor series expansion of an input x:

$$y(x) = C_0 + C_1 x + C_2 x^2 + C_3 x^3 + C_4 x^4 + \ldots C_k x^k \qquad \text{Eq. 1}$$

where $C_0, C_1, C_2, C_3, C_4, \ldots C_k$ are constants representative of the behavior of the non-linear amplifier. The order within the series is determined by the highest power of x in the expansion. The even order ($x^{2n}$ where n=1, 2, 3 ...) terms in the series (e.g., $C_2 x^2, C_2 x^4, C_2 x^6, \ldots$) represent even order distortion and the odd order ($x^{2n+1}$ where n=1, 2, 3 ...) terms in the series (e.g., $C_2 x^3, C_2 x^5, C_2 x^7, \ldots$) represent odd order distortion. For example, $C_2 x^2$ is the second-order term and represents distortion from the first of the even order terms and $C_3 x^3$ is the third-order term and represents distortion from the first of the odd order terms. When the input x is an RF input, both x and y are time-varying quantities. With an input having two angular frequencies ($\omega_1$ and $\omega_2$) represented as x=a sin($\omega_1$t)+b sin($\omega_2$t), the second order term $C_2 x^2$ creates second order distortion products at frequencies $2\omega_1$, $2\omega_2$, $\omega_1-\omega_2$, and $\omega_1+\omega_2$. Because the non-linear element in this case is time independent, the magnitude and phase of these distortion products are not dependent upon the modulation frequency.

When the non-linear element also has time dependence, such as for lasers, the Taylor series is expanded to include the time dependent terms as follows:

$$\begin{aligned} y(x(t)) = &\; C_{00} + C_{01}x + C_{02}x^2 + C_{03}x^3 + \ldots C_{0k}x^k + \\ &\; C_{11}\frac{dx}{dt} + C_{12}x\frac{dx}{dt} + C_{13}x^2\frac{dx}{dt} + \ldots C_{1k}x^{k-1}\frac{dx}{dt} + \\ &\; C_{21}\frac{d^2x}{dt^2} + C_{22}x\frac{d^2x}{dt^2} + C_{23}x^2\frac{d^2x}{dt^2} + \ldots C_{2k}x^{k-1}\frac{d^2x}{dt^2} + \\ &\; n1_{21}\frac{d^n x}{dt^n} + C_{n2}x\frac{d^n x}{dt^n} + C_{n3}x^2\frac{d^n x}{dt^n} + \ldots C_{nk}x^{k-1}\frac{d^n x}{dt^n} \end{aligned} \qquad \text{Eq. 2}$$

When an input having two angular frequencies ($\omega_1$ and $\omega_2$) represented as x=a sin($\omega_1$t)+b sin($\omega_2$t) is applied to the above time dependent non-linear element, the second order distortion at frequencies $2\omega_1$, $2\omega_2$, $\omega_1-\omega_2$, and $\omega_1+\omega_2$ will have an amplitude and phase that is dependent on frequency. For the $2\omega_1$ term, the dependence may be represented as follows:

$$y_{2\omega_1} = \frac{a^2}{2}[C_{02}\cos(2\omega_1 t) + C_{12}\omega_1\sin(2\omega_1 t) - C_{22}\omega_1^2\cos(2\omega_1 t) + \ldots] \qquad \text{Eq. 3}$$

The first term in the above series represents the frequency independent term. The remaining terms represent frequency dependent terms that are a result of the time dependence upon distortion. A similar dependence can be found for other second order distortion products.

For any given non-linear element, such as a laser, the magnitude and sign of the coefficients of the time dependent Taylor series expansions are often unknown. Furthermore, the magnitude and sign of the coefficients can change with parameters such as, for example, laser power or temperature. When multiple non-linear elements are present in a system, such as the case for hybrid fiber coax transmission systems using direct modulated lasers, the coefficients of the Taylor series expansion describing the system will be related to the sum of the respective coefficients describing the non-linear elements within the system. Other non-linear elements in a hybrid fiber coax transmission system could be, for example, the fiber used to transmit the optical signal. The result of summing these coefficients is that not only is the magnitude of the system coefficients often unknown, so is the sign. Also both magnitude and sign of the system coefficient can change with system parameters.

Several techniques have been proposed or employed to compensate for distortion by injecting distortion of equal magnitude but opposite phase to the distortion produced by the laser device. For example, a predistortion circuit may be employed to predistort the RF signal being applied to modulate the laser. One such predistortion circuit includes split signal paths—a main or primary signal path and a secondary signal path. A small sample of the RF input is tapped off the main signal path and a distortion generator in the secondary signal path generates distortion (i.e., predistortion). The predistortion is then recombined with the RF signal on the main signal path such that the predistortion is of equal magnitude but opposite sign to the laser-induced distortion.

These predistortion circuits have been proposed or employed using frequency independent magnitude adjustments in the secondary path and even magnitude-phase tilt filters to account for the frequency dependent effects. However, such existing predistortion circuits may not be effective to compensate for element and/or system distortion both initially and/or during operation and/or with changes in system parameters.

Non-linear laser devices may also have distortion characteristics dependent on the frequency of the modulating signal. Such frequency dependent nonlinearities are sometimes referred to as frequency tilt. Existing predistortion circuits may not adequately compensate for such frequency-dependent distortion. Further, other non-linear elements may also contribute to distortion. In an optical system, for example, non-linear elements may include at least the laser, optical fiber and amplifier non-linearities.

BRIEF DESCRIPTION OF THE DRAWINGS

These and other features and advantages will be better understood by reading the following detailed description, taken together with the drawings wherein.

DETAILED DESCRIPTION

A distortion compensation circuit, consistent with embodiments of the present invention, may be used with one or more non-linear elements to compensate for distortion generated by the non-linear element(s), for example, in broadband applications. As will be described in greater detail below, embodiments of the distortion compensation circuit may include a distortion path that produces distortion products for which the phase may be controllably shifted and/or inverted. The distortion compensation circuit may include, for example, a frequency dependent distortion path to produce distortion that compensates for frequency dependent distortion generated by the non-linear element(s), such as, for example, optical fiber induced dispersion. The distortion compensation circuit may also generate a level of frequency independent distortion to compensate for laser generated distortion.

Distortion compensation circuits may include predistortion circuits, which generate compensating distortion before the non-linear element(s), for example, in an optical transmitter. Distortion compensation circuits may also include post-distortion circuits, which generate compensating distortion after the non-linear element(s), for example, in an optical receiver. Although some of the exemplary embodiments may refer specifically to predistortion circuits, the concepts described herein may be used with predistortion compensation, postdistortion compensation, or a combination thereof. Thus, distortion compensation circuits, consistent with the embodiments described herein, may be used to compensate for distortion produced by one or more non-linear elements before and/or after the distortion compensation circuits.

Figure 1:
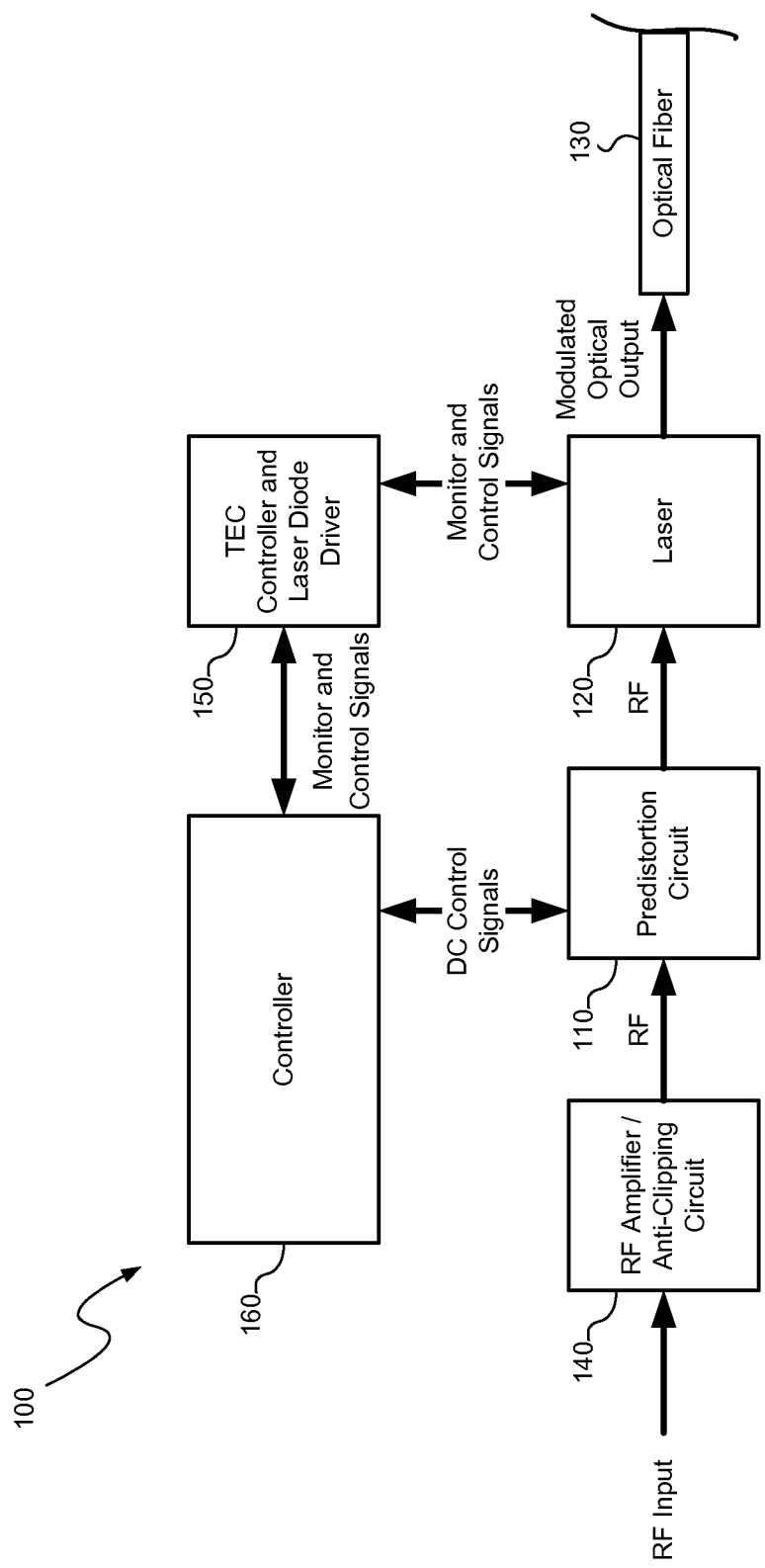
FIG. 1 is a schematic diagram of an optical transmitter including a predistortion circuit, consistent with one embodiment of the invention.

Referring to FIG. 1, an optical transmitter 100 may include a predistortion circuit 110 to generate predistortion that compensates for distortion produced by one or more non-linear elements, such as a laser 120 and/or an optical fiber 130 when a RF signal modulates the laser 120 to produce a modulated optical output coupled into the optical fiber 130. As used herein, "compensate" or "compensating" for distortion means reducing distortion to a point that is tolerable in a particular system and does not necessarily require elimination of distortion. To compensate for distortion produced by the laser 120, the predistortion may be generated by the predistortion circuit 110 with a magnitude substantially equal to the magnitude of the distortion produced by the laser 120 and a phase that is substantially opposite the phase of the distortion produced by the laser 120, optical fiber 130 and/or other non-linear elements such as amplifier non-linearities.

According to one embodiment, the optical transmitter 100 may include RF amplifier/anti-clipping circuit 140 to receive and amplify the RF input signal (e.g., a multi-channel carrier multiplex signal) and/or to modify the RF input signal to prevent or reduce clipping in the laser 120. One example of an anti-clipping circuit is the type described in greater detail in commonly-owned U.S. patent application Ser. No. 11/753, 082, which is incorporated herein by reference. The predistortion circuit 110 may then receive the amplified RF signal, generate the predistortion and combine the predistortion with the RF signal that modulates the laser 120. The laser 120 may be a directly-modulated electrically pumped semiconductor laser, such as a laser diode.

One embodiment of the optical transmitter 100 may further include thermo-electric cooler (TEC) controller and laser diode driver circuitry 150 to control the temperature of and to bias the laser 120. A controller 160, such as a microprocessor, may be used to control the components and the operation of the optical transmitter 100. The TEC controller and laser diode driver circuitry 150 and the microcontroller 160 may include components known to those skilled in the art for use in a laser transmitter, such as the type available from Applied Optoelectronics, Inc.

One example of an optical transmitter 100 is a laser transmitter designed for forward-path CATV applications. In such "broadband" applications, the optical transmitter 100 and particularly the laser 120 may be designed for high frequency operation, for example, up to about 1 GHz. The embodiments described herein have particular application in hybrid fiber coaxial transmission systems for the reduction of CSO distortion in broadband carrier multiplexed transmissions, although they could be applied to any situation in which the reduction of even order distortion is desired for a particular class of non-linear effects. The distortion compensation circuits and methods described herein may also be used in other applications (e.g., using different or even higher frequencies) and/or with other types of optical transmitters. Embodiments of the distortion compensation circuits may also be used with any non-linear element or device that generates distortion that can be compensated with predistortion or postdistortion.

Figure 2:
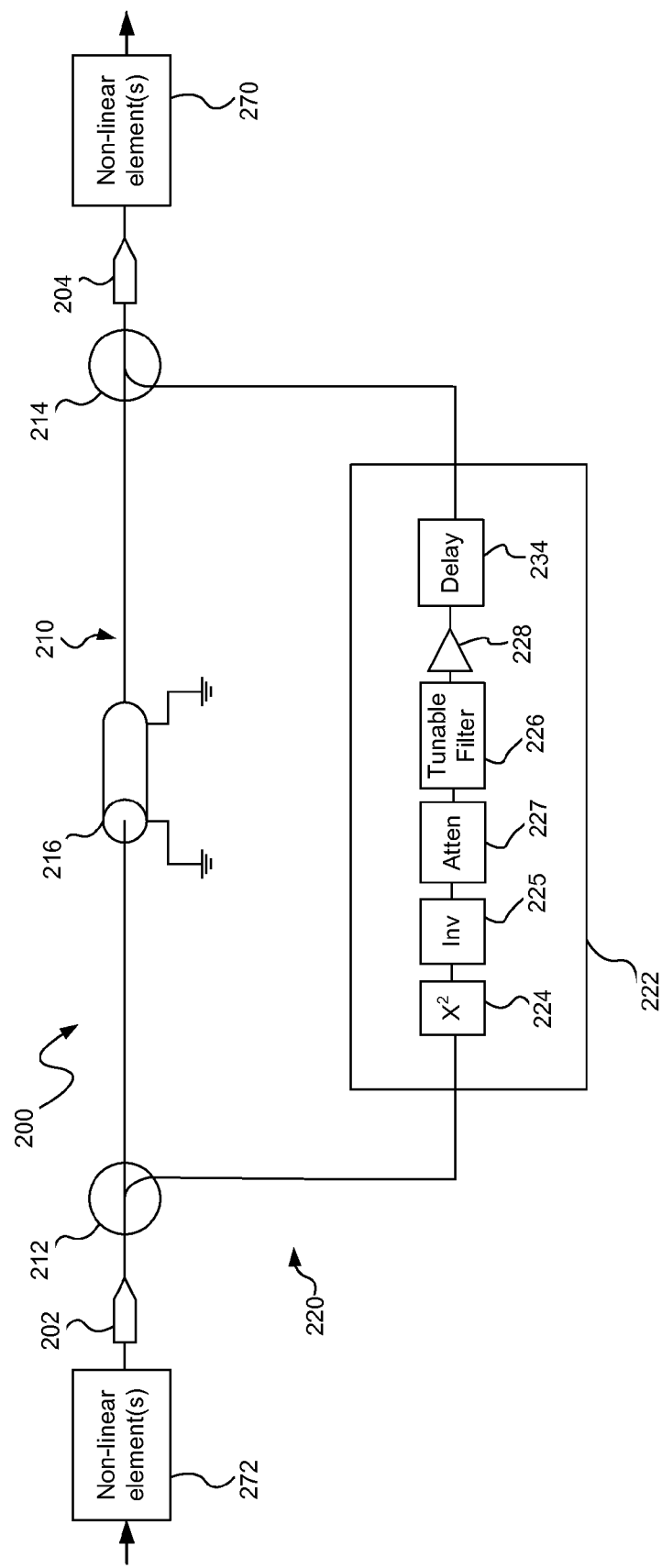
FIG. 2 is a schematic diagram of a distortion compensation circuit including an invertible distortion path, consistent with one embodiment of the invention.

Referring to FIG. 2, a distortion compensation circuit 200, consistent with an embodiment of the present invention, is described in greater detail. The distortion compensation circuit 200 receives a RF input signal at a signal input 202, generates compensating predistortion and/or postdistortion, and provides the RF signal combined with the compensating predistortion and/or postdistortion at a signal output 204. The distortion compensation circuit 200 may include a primary signal path 210 and a secondary signal path 220 that are coupled together, for example, using directional couplers such as a directional splitter 212 and a directional combiner 214. At the directional splitter 212, at least a portion of the RF input signal power is received on the primary and secondary signal paths 210, 220, respectively.

The secondary signal path 220 produces intermodulation distortion products from the RF input signal received on the secondary signal path 220. In the exemplary embodiment, the distortion compensation circuit 200 compensates for composite second order (CSO) distortion and the secondary signal path 220 produces second-order intermodulation distortion products.

At the directional combiner 214, intermodulation distortion products produced on the secondary signal path 220 are combined with the RF input signal on the primary signal path 210 with a desired magnitude and phase to compensate for distortion. Where the distortion compensation circuit is a predistortion circuit, such as 110 in FIG. 1, the intermodulation distortion products provide compensating predistortion combined with the RF signal to produce a predistorted RF signal that compensates for distortion generated by one or more non-linear elements 270 following the distortion compensation circuit 200. Where the distortion compensation circuit 200 is a postdistortion circuit, the intermodulation distortion products provide compensating postdistortion combined with the RF signal to compensate for the distortion already caused by one or more non-linear elements 272 located before the distortion compensation circuit 200.

The primary signal path 210 may include a delay element 216, such as a transmission line of a selected length, which delays the RF input signal on the primary signal path 210 to correspond to the delay caused by generating the compensating distortion on the secondary signal path 220. Such a delay helps to ensure that the compensating distortion on the secondary signal path 220 remains in phase with the RF input signal on the primary signal path 210.

According to one embodiment, the secondary signal path 220 may include distortion path 222. The distortion path 222 produces intermodulation distortion products that are dependent on frequency (i.e., frequency dependent distortion products). In particular, distortion may be represented as a time dependent series including distortion terms of different orders of magnitude with the distortion path 222 corresponding to the second order distortion term, which is frequency dependent. Distortion compensation circuits and distortion generating circuitry are described in greater detail in U.S. Patent Application Publication Nos. 2009/0196629 and 2009/0196630, which are incorporated herein by reference.

The distortion path 222 may include distortion generator 224 that generates the intermodulation distortion products from the RF input signal. In a distortion compensation circuit that compensates for CSO distortion, the distortion generator 224 is a CSO distortion generator including a square law device that generates second order intermodulation products, as will be described in greater detail below. A CSO distortion generator (or second order distortion generator) does not necessarily generate only second order distortion. A CSO distortion generator (or second order distortion generator) may include a distortion generator that produces even-order distortion with predominantly second order distortion. In a distortion compensation circuit that compensates for odd orders of distortion, other distortion generators may be used such as CTB distortion generators to compensate for CTB distortion. A CTB distortion generator may include a distortion generator that produces odd-order distortion with predominantly third order distortion.

To produce the frequency dependent distortion products, the distortion path 222 may further include a tunable filter 226 after the distortion generator 224. The tunable filter 226 may include a varactor having adjustable capacitance to provide fine control over phase distortion in response to a control signal, as will be described in greater detail below. A broadband impedance match is not required in this case because the tunable filter 226 is isolated between the amplifier 228 and the CSO generator 224.

The distortion path 222 may also include a signal controlled phase inverter 225, to invert the phase of the distortion products. Providing a signal controlled phase inverter 225 in the path 222 allows 180° phase change of the path 222. The signal controlled phase inverter 225 may be responsive to a phase inversion control signal (e.g., provided by controller 160 shown in FIG. 1) to select a phase of either 0° or 180°. In other embodiments, a controllable phase inverter may be used and controlled in other ways such as by a manual switch or some other control mechanism (e.g., changing placement of circuit components).

The signal controlled phase inverter 225 may also be located in other locations along the path 222 other than directly following the distortion generator 224. The primary signal path 210 may also include a signal controlled phase inverter (not shown) to provide controllable phase inversion of the RF signal in the primary signal path 210.

The distortion path 222 of the secondary signal path 220 may also include one or more gain control elements, such as a variable attenuator 227 and/or an amplifier 228, before and/or after the distortion generator 224 to control a magnitude of the compensating distortion generated by the distortion generator 224. Variable gain control elements help to ensure that the magnitude of the compensating distortion corresponds sufficiently to the magnitude of the distortion being compensated. The variable attenuator 227 may be a PIN attenuator and may receive attenuation control signals from a controller (e.g., controller 160 shown in FIG. 1) to adjust the attenuation as needed. The distortion path 222 of the secondary signal path 220 may also include a delay component 234 to add small amounts of delay in the path 222 to "zero" out any path length differences.

Figure 3:
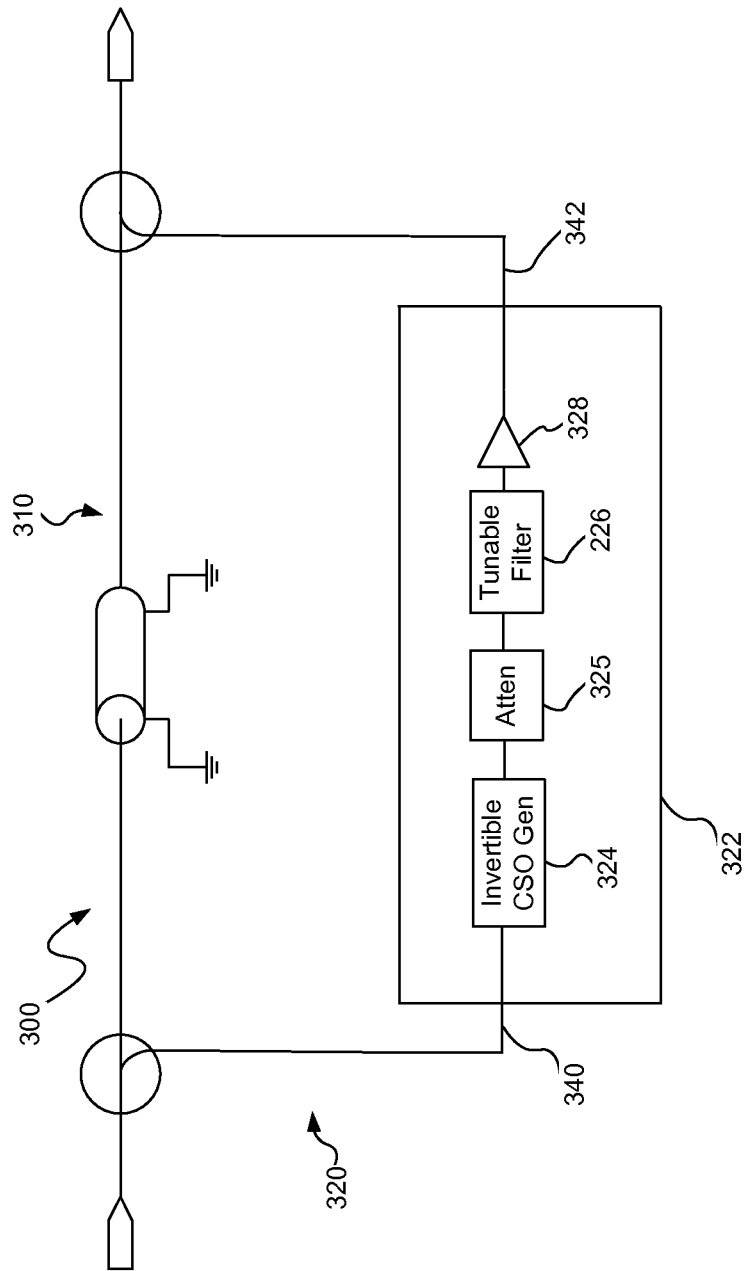
FIG. 3 is a schematic diagram of a distortion compensation circuit including an invertible distortion generator, consistent with another embodiment of the invention.

Referring to FIG. 3, an embodiment of a predistortion circuit 300 is shown and described. The predistortion circuit 300 includes a primary signal path 310 coupled to a secondary signal path 320 similar to the predistortion circuit 200 described above. According to this embodiment, a distortion generator and signal controlled phase inverter are combined as an invertible distortion generator 324, in the frequency dependent distortion path 322. This embodiment of the predistortion circuit further includes tunable filter 226, attenuator 325 and amplifier 328 in the path 322, as described above. Although the exemplary embodiment shows invertible CSO distortion generator 324, other types of distortion generators (e.g., CTB distortion generators) may be invertible.

According to this embodiment of the predistortion circuit 300, the impedance in the portion 342 of the path 322 after the invertible CSO distortion generator 324 is lower than the impedance in the portion 340 of the path 322 before the invertible CSO generator 324. In one embodiment, the impedance is 75 ohms in the primary signal path 310 and a portion of the secondary signal path 320 but changes from 75 ohms to 50 ohms after the CSO generator 324. This change in impedance may provide better magnitude-phase versus frequency characteristics from the CSO generator and may enable the use of lower cost amplifiers 328 in the secondary path. Although the predistortion circuit 300 is shown in FIG. 3 with this impedance change, other predistortion circuits described herein may also include these impedance characteristics.

Figure 4:
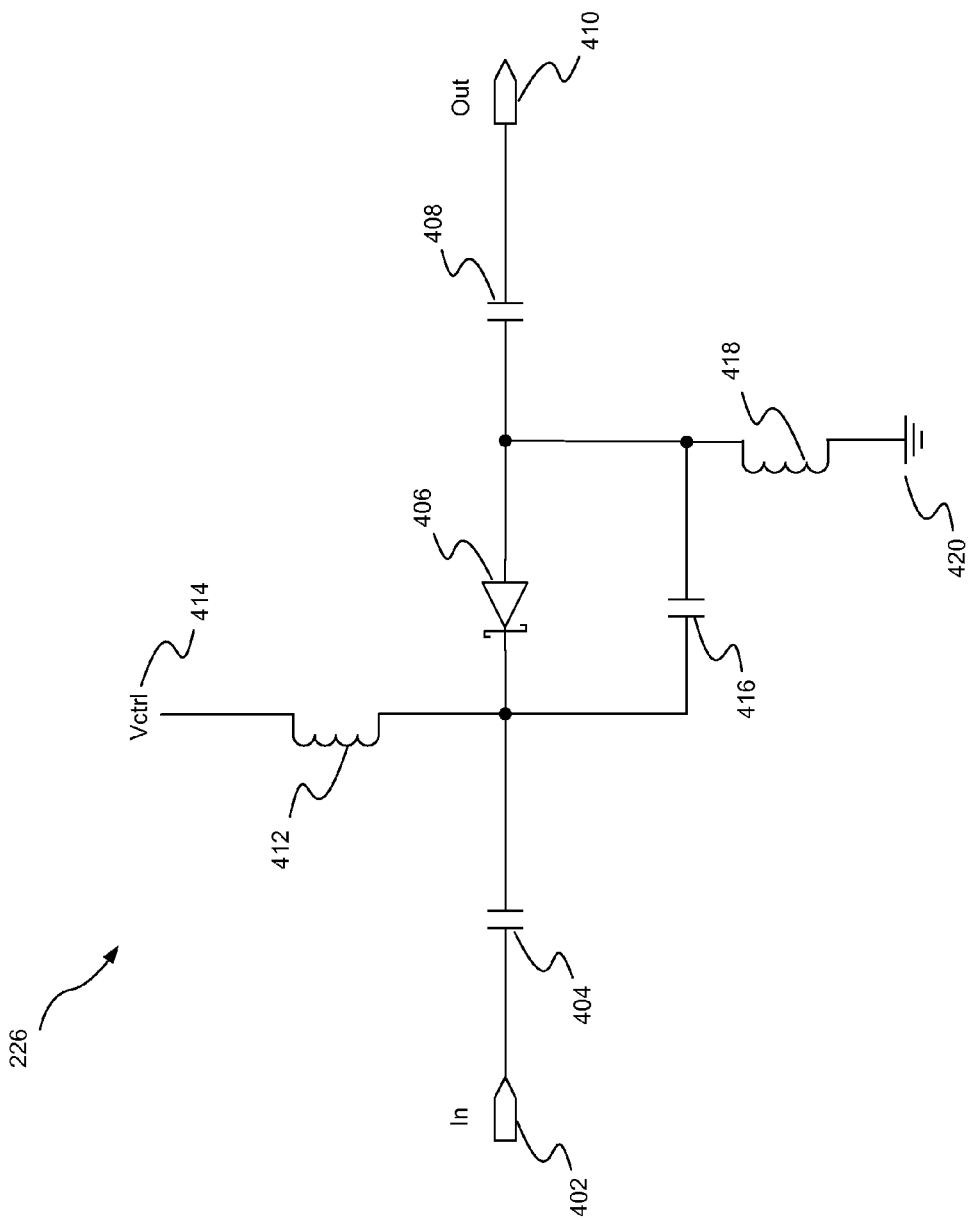
FIG. 4 is a schematic diagram of a tunable phase filter circuit, consistent with a further embodiment of the present invention.

FIG. 4 is a schematic diagram of a tunable phase filter circuit 226, consistent with an embodiment of the present invention. The tunable phase filter circuit 226 includes a varactor 406 which is serially coupled between input port 402 and output port 410, creating a signal path for the generated distortion products. A varactor is a device that combines the properties of a diode with the properties of a voltage controlled (i.e., variable) capacitor. In tunable phase filter circuit 226, the capacitance of varactor 406 depends on the control voltage, Vctrl 414, which is applied as a bias voltage to the varactor. Thus, the capacitance may be adjusted by varying the control voltage. By adjusting the capacitance of varactor 406, the phase of the distortion may be controlled with increased accuracy which may be useful when compensating for frequency dependent distortion induced by optical fiber dispersion. Additionally, the diode properties of varactor 406 generate frequency independent distortion which may provide a degree of compensation for the frequency independent distortion generated by a laser.

Capacitors 404 and 408, which act as high pass filters, are provided to block the DC bias currents, associated with the Vctrl 414 signal, from the input and output ports 412 and 410, respectively. Inductors 412 and 418, which act as low pass filters, are provided to block the RF distortion signal from the Vctrl source 414 and ground 420, respectively.

Additionally, in some embodiments, a fixed value capacitor 416 may be coupled in parallel with varactor 406 to shift the tunable range of capacitance provided by varactor 406 by a pre-determined amount so that the tunable range encompasses the frequency independent distortion generated by the laser.

Figure 5:
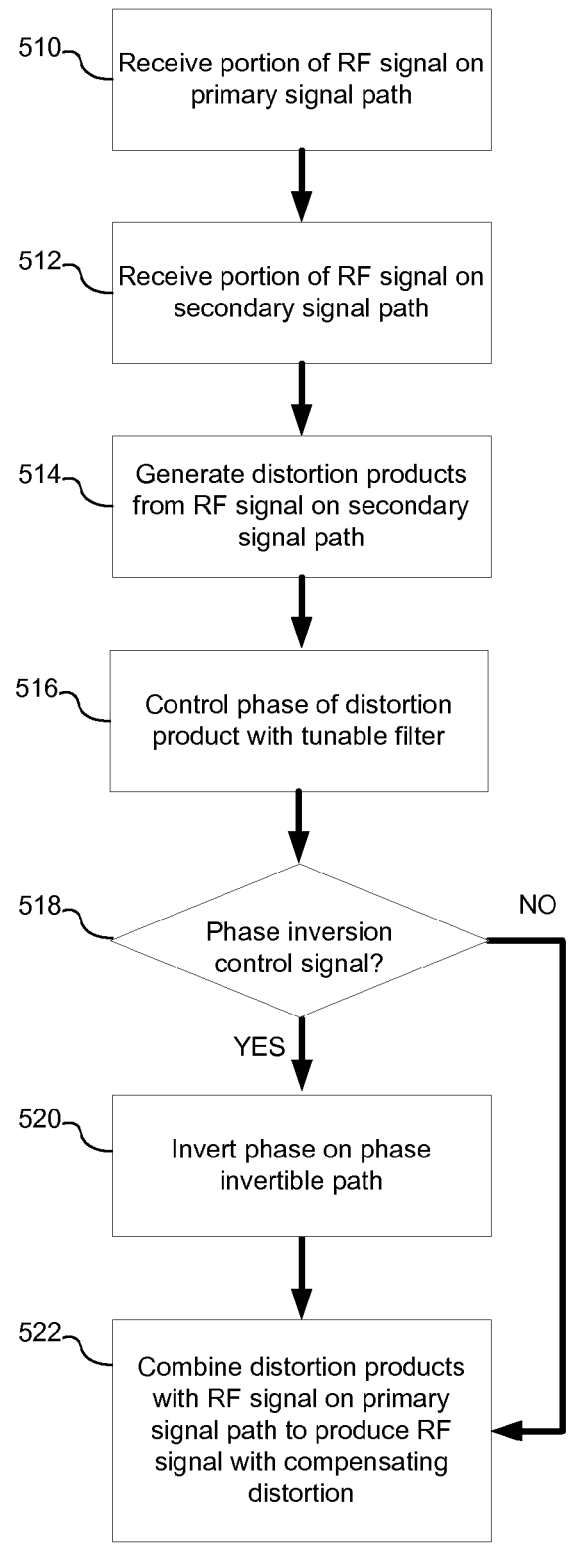
FIG. 5 is a flow chart illustrating one method of compensating for distortion produced by a non-linear element, consistent with one embodiment of the present invention.

FIG. 5 illustrates one method of compensating for distortion generated by one or more non-linear elements, such as a laser in an optical transmitter. This method may be performed using a distortion compensation circuit according to any of the configurations described above or using other distortion compensation circuits including a phase invertible path. In one exemplary embodiment where a laser is used in a laser transmitter designed for forward path CATV applications, the method may be used to compensate for distortion produced by a laser directly modulated with a multi-channel RF signal including frequencies as high as 1 GHz.

The exemplary method includes receiving 510 a portion of the RF signal on a primary signal path and receiving 512 a portion of the RF signal on a secondary signal path. Distortion products may then be generated 514 on the secondary signal path. The distortion products may include, for example, second order intermodulation distortion products generated by a CSO distortion generator. Generating distortion products may also include generating both frequency independent and frequency dependent distortion products. The phase of the distortion products may be adjusted 516 with a tunable filter in response to a phase adjustment control signal which may be generated by a controller or microprocessor based on various static and/or dynamice parameters as described below. In some embodiments, these parameters may include, for example, laser power, input RF channel loading, temperature and optical fiber length.

The exemplary method also includes determining 518 if a phase inversion control signal is received. The phase inversion control signal may be generated by a controller or microprocessor based on various parameters. The parameters may include static parameters that are known to affect the distortion in the output signal from the non-linear amplifier. In an optical system, for example, one such static parameter affecting distortion is the fiber length of an optical fiber coupled to a laser. Another static parameter affecting distortion may be the type of optical transmitter. In dense wavelength division multiplexed (DWDM) transmitters, for example, RF inverted boards may be used and sometimes produce CSO distortion with 180° opposite phase. If these static parameters are determined to require phase inversion in any of the phase invertible paths of the distortion compensation circuit, the controller or microprocessor may be programmed to provide the phase inversion control signal(s) to the appropriate phase inverter and/or invertible distortion generator.

The phase inversion control signal may also be generated by a controller or microprocessor based on dynamic parameters that change during operation to affect the distortion in the output signal from the non-linear amplifier. In an optical system, for example, dynamic parameters affecting distortion may include bias current and temperature. The controller or microprocessor may receive and/or monitor these parameters, determine when the parameter affects the system distortion in a way that would require phase inversion in any of the phase invertible paths, and provide the phase inversion control signal(s) to the appropriate phase inverter and/or invertible distortion generator. With respect to temperature, for example, the controller or microprocessor may have a temperature input coupled to a temperature sensor that measures temperatures (e.g., within a range of about −20° C. to 65° C.). The controller or microprocessor may also include firmware that determines when a temperature change requires phase inversion and causes the phase inversion control signal to be generated in response to such changes. Of course, the controller or microprocessor may also control other aspects of the distortion on the secondary signal path, such as the magnitude of the distortion (e.g., by controlling the attenuation).

If the phase inversion control signal is received (e.g., by a signal controlled phase inverter and/or an invertible distortion generator), the phase of the signal on the phase invertible path is inverted 520. For example, the phase of the distortion products generated on the secondary path may be inverted. The compensating distortion products are then combined 522 with the RF signal on the primary signal path to provide compensating predistortion and/or compensating postdistortion. If the phase inversion signal is not received, the compensating distortion products are combined 522 with the RF signal on the primary signal path without inverting the distortion products. The compensating distortion combined with the RF signal compensates for the distortion generated by one or more non-linear elements. A predistorted RF signal, for example, may be provided to the non-linear element such that the distortion generated by the non-linear element is compensated.

Although an exemplary method of compensating for distortion is shown and described above, those skilled in the art will recognize that variations of this method are possible and within the scope of the present invention. For example, one or more acts of the method of distortion compensation may be performed in a different sequence or may be eliminated. Also, one or more additional acts may be performed in addition to or instead of those described above.

Accordingly, the distortion compensation circuits, invertible distortion generators and methods described herein may significantly improve distortion compensation and control over distortion compensation of non-linear elements, such as lasers and optical fibers in optical systems. Consistent with one embodiment, a distortion compensation circuit for compensating for distortion produced by at least one non-linear element includes a primary signal path configured to carry at least a portion of the magnitude of an input signal and a secondary signal path coupled to the primary signal path. The secondary signal path is configured to receive at least a portion of the input signal, to generate distortion, and to add at least a portion of the generated distortion back into the primary signal path. The distortion compensation circuit further comprises a tunable filter configured to control the phase of the generated distortion in response to a phase adjustment control signal. The distortion compensation circuit further comprises a controllable phase inverter located in the secondary signal path. The controllable phase inverter is configured to invert the phase of the signal on the secondary path in response to a phase inversion control signal.

Consistent with yet another embodiment, a method is provided for compensating for distortion produced by at least one non-linear element. The method includes: providing a distortion compensation circuit including a primary signal path and a secondary signal path coupled to the primary signal path; receiving a portion of a RF signal on the primary signal path; receiving a portion of a RF signal on the secondary signal path; generating distortion from the RF signal on the secondary signal path; controlling a phase of the generated distortion in response to a phase adjustment control signal applied to a tunable filter; inverting a phase of a signal on the secondary path in response to the phase inversion control signal; and combining the intermodulation distortion products on the secondary signal path with the RF signal on the primary path to produce the RF signal with compensating distortion.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A distortion compensation circuit for compensation of distortion produced by at least one non-linear element, said distortion compensation circuit comprising:
    a primary signal path configured to carry at least a portion of the magnitude of an input signal;
    a secondary signal path coupled to said primary signal path, said secondary signal path configured to receive at least a portion of said input signal, to generate distortion, and to add at least a portion of said generated distortion back into said primary signal path;
    a tunable filter located in said secondary signal path, said tunable filter configured to control the phase of said generated distortion in response to a phase adjustment control signal, wherein said tunable filter comprises:
    a varactor having adjustable capacitance to control the phase of said generated distortion in response to said phase adjustment control signal; and
    capacitors coupled in series with said varactor, said capacitors configured to block said phase adjustment control signal from extending beyond said tunable filter; and
    a signal controlled phase inverter located in said secondary signal path, said signal controlled phase inverter being configured to invert said phase of said signal on said secondary path in response to a phase inversion control signal.

2. The distortion compensation circuit of claim 1 wherein said varactor is further configured to provide frequency independent distortion.

3. The distortion compensation circuit of claim 1 further comprising a fixed value capacitor coupled in parallel with said varactor, said fixed value capacitor configured to shift the range of said phase adjustment provided by said adjustable capacitance generated by said varactor.

4. The distortion compensation circuit of claim 1 further comprising a first bias inductor coupled between said varactor and the source of said phase adjustment control signal, said first bias inductor configured to block said portion of said input signal from said source of said phase adjustment control signal.

5. The distortion compensation circuit of claim 4 further comprising a second bias inductor coupled between said varactor and ground, said second bias inductor configured to block said portion of said input signal from said ground.

6. The distortion compensation circuit of claim 1 wherein said secondary signal path is configured to generate even order distortion.

7. The distortion compensation circuit of claim 1 further comprising at least one distortion generator configured to generate distortion products from said input signal on said secondary path.

8. The distortion compensation circuit of claim 7 wherein said distortion generator is a composite second order (CSO) distortion generator configured to produce second-order intermodulation distortion products from said input signal.

9. The distortion compensation circuit of claim 1 further comprising:
    a splitter coupling said primary signal path to said secondary signal path and configured to split said input signal into said portions received on said primary signal path and said secondary signal path; and
    a combiner coupling said primary signal path to said secondary signal path and configured to cause said distortion products on said secondary signal path to be combined with said input signal on said primary signal path.

10. The distortion compensation circuit of claim 7 wherein said signal controlled phase inverter is coupled directly to said distortion generator providing an invertible distortion generator.

11. The distortion compensation circuit of claim 1 wherein said secondary signal path includes at least one gain control element configured to adjust the magnitude of said distortion products.

12. The distortion compensation circuit of claim 7 wherein a portion of said secondary signal path after said distortion generator has an impedance lower than an impedance of a portion of said secondary signal path before said distortion generator.

13. The distortion compensation circuit of claim 7 wherein said secondary signal path has an impedance of about 50 ohms before said distortion generator, and wherein the other portions of said secondary signal path and said primary signal path have an impedance of about 75 ohms.

14. The distortion compensation circuit of claim 1 wherein said phase adjustment control signal is based on a parameter selected from the group consisting of laser power, input RF channel loading, temperature and fiber length.

15. A method of compensating for distortion produced by at least one non-linear element, the method comprising:
- providing a distortion compensation circuit including a primary signal path and a secondary signal path coupled to said primary signal path;
- receiving a portion of a RF signal on said primary signal path;
- receiving a portion of said RF signal on said secondary signal path;
- generating distortion from said RF input signal on said secondary signal path;
- controlling a phase of said generated distortion in response to a phase adjustment control signal applied to a tunable filter, wherein said tunable filter comprises a varactor providing adjustable capacitance in response to said phase adjustment control signal and wherein said tunable filter comprises capacitors coupled in series with said varactor for blocking said phase adjustment control signal from extending beyond said tunable filter;
- inverting said phase of said signal on said secondary path in response to a phase inversion control signal; and
- combining said distortion on said secondary signal path with said RF signal on said primary path to produce an RF signal with compensating distortion.

16. The method of claim 15 further comprising adjusting the magnitude of said distortion products using a gain control element in said secondary path.

17. The method of claim 15 further comprising monitoring temperature and determining if changes in temperature affect phase of distortion produced by said non-linear element, and wherein said phase inversion control signal is generated if said changes in temperature require phase inversion of said distortion produced on said secondary signal path.

18. The method of claim 15 wherein said non-linear element includes a laser, wherein said RF signal with compensating distortion is a predistorted RF signal, and further comprising providing said predistorted RF signal to said laser.

19. The method of claim 15 wherein generating said distortion includes generating second order intermodulation distortion products.

20. The method of claim 15 wherein said phase adjustment control signal is based on a parameter selected from the group consisting of laser power, input RF channel loading, temperature and fiber length.

* * * * *